(12) United States Patent
Sangu et al.

(10) Patent No.: US 12,339,464 B2
(45) Date of Patent: Jun. 24, 2025

(54) APPARATUS FOR FORMING LINE BEAM

(71) Applicant: SAMSUNG DISPLAY CO., LTD., Yongin-si (KR)

(72) Inventors: Akifumi Sangu, Yongin-si (KR); Jekil Ryu, Yongin-si (KR); Cheolho Park, Yongin-si (KR); Haesook Lee, Yongin-si (KR); Youngsu Chae, Yongin-si (KR); Gyoowan Han, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 845 days.

(21) Appl. No.: 17/092,669

(22) Filed: Nov. 9, 2020

(65) Prior Publication Data

US 2021/0333564 A1 Oct. 28, 2021

(30) Foreign Application Priority Data

Apr. 23, 2020 (KR) ........................ 10-2020-0049483

(51) Int. Cl.
*G02B 27/09* (2006.01)
*B23K 26/06* (2014.01)
(Continued)

(52) U.S. Cl.
CPC ...... *G02B 27/0927* (2013.01); *B23K 26/0648* (2013.01); *B23K 26/0676* (2013.01);
(Continued)

(58) Field of Classification Search
CPC ............ G02B 27/0927; G02B 27/0955; G02B 27/0983; G02B 27/0905; G02B 3/005;
(Continued)

(56) References Cited

U.S. PATENT DOCUMENTS 5,721,416 A * 2/1998 Burghardt .......... B23K 26/0738
219/121.73
6,888,680 B2 5/2005 Wolleschensky
(Continued)

FOREIGN PATENT DOCUMENTS

CN 109477970 A * 3/2019 ......... B23K 26/0006
CN 110640306 A 1/2020
(Continued)

OTHER PUBLICATIONS

"Lens" Wikipedia article, published Nov. 2019, pp. 1 and 8.*
Office Action dated Apr. 27, 2025 in corresponding CN Patent Application No. 202110301775.2, 6 pages.

*Primary Examiner* — George G. King
*Assistant Examiner* — Anna Smith
(74) *Attorney, Agent, or Firm* — F. CHAU & ASSOCIATES, LLC

(57) ABSTRACT

The present disclosure relates to an apparatus for forming a line beam. The apparatus includes a laser source, a telescope unit, a beam-transforming unit, a Fourier unit, a long-axis optical unit, and a short-axis optical unit. The laser source is configured to generate input light. The telescope unit is configured to magnify the input light in an X-axis direction perpendicular to an optical axis, which is a progression direction of the input light. The beam-transforming unit is configured to divide light incident from the telescope unit into a plurality of sub-columns. The Fourier unit is configured to uniformly mix the plurality of sub-columns. The long-axis optical unit is configured to uniformly disperse light mixed by the Fourier unit in the X-axis direction. The short-axis optical unit is configured to focus light passing through the long-axis optical unit onto a reference plane, wherein the short-axis optical unit includes a concave reflec-
(Continued)

tive surface, and a curvature of the reflective surface is maintained constant in the X-axis direction.

19 Claims, 8 Drawing Sheets

(51) Int. Cl.
*B23K 26/067* (2006.01)
*B23K 26/073* (2006.01)
*H01S 3/00* (2006.01)

(52) U.S. Cl.
CPC ........ *B23K 26/0738* (2013.01); *H01S 3/0071* (2013.01); *H01S 3/0085* (2013.01)

(58) Field of Classification Search
CPC .............. G02B 3/0062; B23K 26/0648; B23K 26/0676; B23K 26/0738; H01S 3/0071; H01S 3/0085; H01S 3/105
See application file for complete search history.

(56) References Cited

U.S. PATENT DOCUMENTS

| | | |
|---|---|---|
| 7,079,566 B2 | 7/2006 | Kido et al. |
| 7,782,535 B2 | 8/2010 | Mikliaev et al. |
| 8,723,073 B2 | 5/2014 | Weigl et al. |
| 10,437,072 B2 | 10/2019 | Moon et al. |
| 2003/0075529 A1 | 4/2003 | Mazumder et al. |
| 2005/0063079 A1* | 3/2005 | MacKinnon .............. G02B 5/09 359/853 |
| 2008/0013182 A1* | 1/2008 | Ferber ................. B23K 26/0648 359/619 |
| 2011/0255088 A1* | 10/2011 | Dane .................... B23K 26/356 356/370 |
| 2013/0229653 A1* | 9/2013 | Tatsuta ...................... G01J 3/10 359/570 |
| 2018/0062342 A1* | 3/2018 | Comstock, II ..... B23K 26/0624 |
| 2019/0151987 A1 | 5/2019 | Huonker et al. |
| 2019/0353912 A1* | 11/2019 | Chen .................. G02B 27/0944 |

FOREIGN PATENT DOCUMENTS

| | | | |
|---|---|---|---|
| JP | 2006-171348 A2 | 6/2006 | |
| JP | 4171787 | 8/2008 | |
| JP | 5868405 | 1/2016 | |
| KR | 10-0951370 | 4/2010 | |
| KR | 10-1606105 | 3/2016 | |
| KR | 10-1738155 | 6/2017 | |
| KR | 10-2019-0034589 | 4/2019 | |
| KR | 20200001661 A * | 1/2020 | |
| WO | 2012015819 | 2/2012 | |
| WO | WO-2017149064 A1 * | 9/2017 | ......... G02B 19/0047 |

* cited by examiner

APPARATUS FOR FORMING LINE BEAM

CROSS-REFERENCE TO RELATED APPLICATION

This application claims the benefit of Korean Patent Application No. 10-2020-0049483, filed on Apr. 23, 2020, in the Korean Intellectual Property Office, the disclosure of which is incorporated by reference herein in its entirety.

BACKGROUND

1. Field

One or more embodiments relate to an apparatus for forming a line-shaped beam.

2. Description of Related Art

A laser apparatus is a device used to emit light in a focused beam, called a laser beam. A laser beam generated from a laser apparatuses may have a Gaussian or quasi-Gaussian energy distribution. A laser beam with a Gaussian energy distribution provides beam condensation with a small focus. However, uniform irradiation of a laser beam over a large area may be difficult.

In a semiconductor crystallization process, a uniform laser may be irradiated over a predetermined area. In some cases, the laser beam has a line shape or a rectangular shape. When irradiating a laser beam with a line shape, the power per unit area of the laser beam may be increased by reducing a cross-sectional width of the line beam. This can improve the efficiency of the laser irradiation process.

In some cases, a line beam is condensed such that a cross-sectional width of the beam is reduced when the line beam passes through a focusing lens. However, as a line beam passes through the focusing lens, the focusing lens may thermally expand, and a focal length of the focusing lens may change. This may cause a defect to be generated during a laser irradiation process. Therefore, there is a need in the art to reduce the thermal expansion of a lens.

SUMMARY

One or more embodiments include an apparatus for forming a line beam in which a focal length of a focusing lens associated with a line beam may be prevented from changing during a laser irradiation process by reducing the thermal expansion of the focusing lens. Additional aspects will be set forth in part in the description which follows and, in part, will be apparent from the description, or may be learned by practice of the presented embodiments of the disclosure.

According to one or more embodiments, an apparatus for forming a line beam includes: a laser source configured to generate input light; a telescope unit configured to magnify the input light in an X-axis direction perpendicular to an optical axis to produce magnified light, wherein the optical axis comprises a progression direction of the input light; a beam-transforming unit configured to divide the magnified light from the telescope unit into a plurality of sub-columns; a Fourier unit configured to uniformly mix the plurality of sub-columns to produce mixed light; a long-axis optical unit configured to uniformly disperse the mixed light from the Fourier unit in the X-axis direction to produce dispersed light; and a short-axis optical unit configured to focus the dispersed light from the long-axis optical unit onto a reference plane, wherein the short-axis optical unit includes a concave reflective surface, and a curvature of the reflective surface is constant in the X-axis direction.

The line beam may include a long axis in the X-axis direction and a short axis in a Y-axis direction perpendicular to the X-axis direction, and the short-axis optical unit may reduce a short-axis width of the light passing through the long-axis optical unit. The short-axis optical unit may include fused silica or glass ceramic. The short-axis optical unit may be rotatable with respect to an axis parallel to the X-axis direction.

A cross-section of the reflective surface perpendicular to the X-axis direction may include the shape of at least one of a cylindrical surface, an aspherical surface, an elliptical surface, and a parabolic surface. A first portion of the cross-section of the reflective surface may have a first curvature, and a second portion of the cross-section of the reflective surface may have a second curvature. The plurality of sub-columns may be arranged in the X-axis direction, and the beam-transforming unit may rotate each of the plurality of sub-columns by about 90° with respect to the optical axis. The Fourier unit may include one cylindrical convex lens with a focal length of about 3000 mm to about 15000 mm.

The telescope unit may include a first lens and a second lens apart from each other, a concave surface of an incident surface of the first lens and a convex surface of an exit surface of the first lens may extend to cross each other, and a convex surface of an incident surface of the second lens and a convex surface of an exit surface of the second lens may extend to cross each other.

The convex surface of the exit surface of the first lens and the convex surface of the incident surface of the second lens may extend in parallel to each other, and the concave surface of the incident surface of the first lens and the convex surface of the exit surface of the second lens may extend in parallel to each other.

According to one or more embodiments, an apparatus for forming a line beam includes: a laser source configured to generate input light with a Gaussian profile; a telescope unit configured to magnify the input light in an X-axis direction perpendicular to an optical axis, wherein the optical axis is a progression direction of the input light, and to reduce a width of the input light in a Y-axis direction perpendicular to the optical axis and the X-axis direction to produce magnified light; a beam-transforming unit configured to divide the magnified light from the telescope unit into a plurality of sub-columns; a Fourier unit configured to uniformly mix the plurality of sub-columns to produce mixed light; a long-axis optical unit configured to uniformly disperse the mixed light from the Fourier unit in the X-axis direction; and a short-axis optical unit configured to reflect the mixed light from the long-axis optical unit and focus a flat-top line beam onto a reference plane, the flat-top line beam including a long axis in an X-axis direction and a short axis in a Y-axis direction perpendicular to the X-axis direction, wherein the short-axis optical unit includes a reflective surface configured to reflect the mixed light from the long-axis optical unit, a length of a long axis of the mixed light from the long-axis optical unit is equal to a length of a long axis of the line beam, and a width of a short axis of the mixed light from the long-axis optical unit is greater than a width of a short axis of the line beam.

In some cases, a curvature of a cross-section of the reflective surface perpendicular to the X-axis direction may be maintained constant in a direction parallel to the X-axis direction. The reflective surface may include a concave reflective surface with a cylindrical shape. The short-axis optical unit may include fused silica or glass-ceramic.

The cross-section of the reflective surface may include the shape of at least one of a cylindrical surface, an aspherical surface, an elliptical surface, and a parabolic surface. A first portion of the cross-section of the reflective surface may have a first curvature, and a second portion of the cross-section of the reflective surface may have a second curvature.

The telescope unit may include a first lens and a second lens apart from each other, a concave surface of an incident surface of the first lens and a convex surface of an exit surface of the first lens may extend to cross each other, and a convex surface of an incident surface of the second lens and a convex surface of an exit surface of the second lens may extend to cross each other.

The convex surface of the exit surface of the first lens and the convex surface of the incident surface of the second lens may extend in parallel to each other, and the concave surface of the incident surface of the first lens and the convex surface of the exit surface of the second lens may extend in parallel to each other.

The plurality of sub-columns may be arranged in the X-axis direction, and the beam-transforming unit may rotate each of the plurality of sub-columns by about 90° with respect to the optical axis. The Fourier unit may include one cylindrical convex lens with a focal length of about 3000 mm to about 15000 mm.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
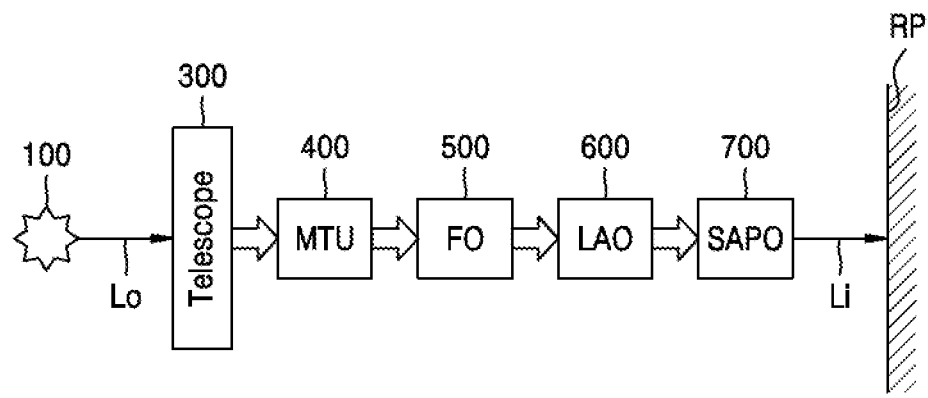
FIG. 1 is a block diagram of an apparatus for forming a line beam according to an embodiment.

The present disclosure relates generally to a laser apparatus. More particularly, embodiments of the present disclosure relate to a laser apparatus capable of forming a line beam. Some embodiments reduce thermal expansion of a lens of the laser apparatus.

A laser is a device that emits light through a process of optical amplification based on the stimulated emission of electromagnetic radiation. The term "laser" originated as an acronym for "light amplification by stimulated emission of radiation". A laser differs from other sources of light in that it emits spatially coherent light. Spatial coherence allows a laser to be focused to a tight spot, enabling applications such as laser cutting and lithography. Spatial coherence also allows a laser beam to stay narrow over great distances (collimation), enabling applications such as laser pointers and lidar. Lasers can also have high temporal coherence, which allows them to emit light with a very narrow frequency spectrum (e.g., a single color of light). Alternatively, temporal coherence can be used to produce pulses of light with a broad spectrum but a short duration.

A laser can be formed that has a greater beam width in one direction compared to another perpendicular direction. One such beam configuration is known as a line beam. In some cases, a laser apparatus may include a focusing lens to focus or direct the beam. When a line beam passes through a focusing lens, the focusing lens expands due to the generation of heat. This can change the focal length of the lens. A change in the focal length can cause a defect during a laser irradiation process. For example, the line beam may not be directed accurately.

Therefore, a line beam forming apparatus of the present disclosure includes a laser source, a telescope unit, a beam-transforming unit, a Fourier unit, a long-axis optical unit, and a short-axis optical unit. The laser source is configured to generate input light. The telescope unit is configured to magnify the input light in an X-axis direction perpendicular to an optical axis, which is a progression direction of the input light. The beam-transforming unit is configured to divide light incident from the telescope unit into a plurality of sub-columns. The Fourier unit is configured to uniformly mix the plurality of sub-columns. The long-axis optical unit is configured to uniformly disperse light mixed by the Fourier unit in the X-axis direction.

The short-axis optical unit is configured to focus light passing through the long-axis optical unit onto a reference plane, wherein the short-axis optical unit includes a concave reflective surface, and a curvature of the reflective surface is maintained constant in the X-axis direction. In some embodiments, a cylindrical reflective surface may be used on the short-axis optical unit to reduce the short-axis width of a laser beam. Accordingly, a change in the focal length of the focusing lens (i.e., a change caused by thermal expansion) may be reduced or prevented.

Reference will now be made, in detail, to embodiments, examples of which are illustrated in the accompanying drawings, wherein like reference numerals refer to like elements throughout the disclosure. The present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the present disclosure allows for various changes and numerous embodiments, exemplary embodiments will be illustrated in the drawings and described in detail in the written description. The effects and characteristics of the present disclosure, and a method of accomplishing the same, will become apparent and more readily appreciated from the following description of the embodiments and the accompanying drawings. However, the present disclosure is not limited to embodiments below and may be implemented in various forms.

It will be understood that although the terms "first," "second," etc. may be used herein to describe various components, these components should not be limited by these terms. These components are only used to distinguish one component from another. As used herein, the singular forms "a," "an," and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. It will be understood that when a layer, region, or component is referred to as being "formed on," another layer, region, or component, the layer, region, or component can be directly or indirectly formed on the other layer, region, or component. For example, intervening layers, regions, or components may be present.

The sizes of elements in the drawings may be exaggerated or reduced for convenience of explanation. In other words, since sizes and thicknesses of components in the drawings are arbitrarily illustrated for convenience of explanation, the following embodiments are not limited thereto. When a certain embodiment may be implemented differently, a specific process order may be performed differently from the described order. For example, two consecutively described processes may be performed substantially at the same time or performed in an order opposite to the described order. Hereinafter, embodiments are described in detail with reference to the accompanying drawings. When description is made with reference to the drawings, like reference numerals are given to like or corresponding elements.

Figure 2:
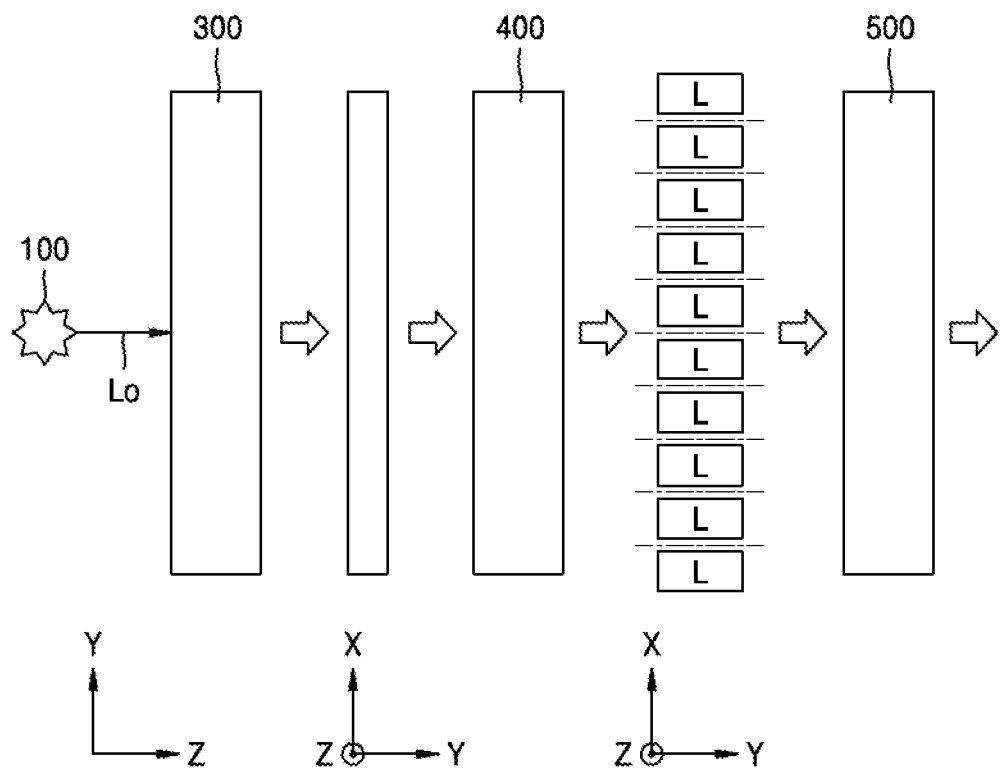
FIG. 2 is a view for explaining a beam-forming principle based on the apparatus for forming a line beam of FIG. 1.
Figure 3:
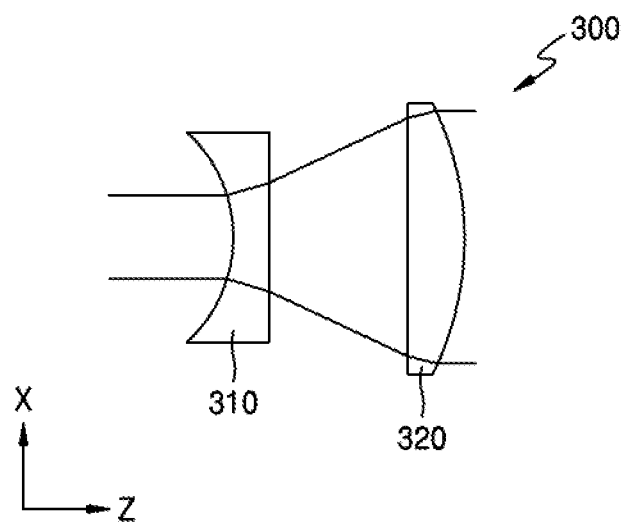
FIGS. 3 and 4 are cross-sectional views of an example of a telescope unit of FIG. 1.
Figure 4:
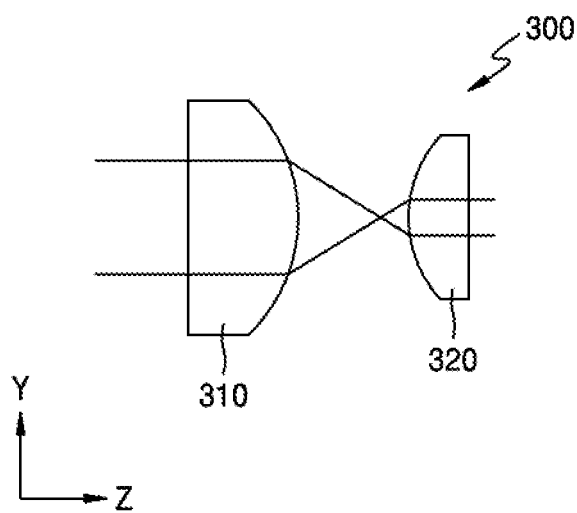
Figure 5:
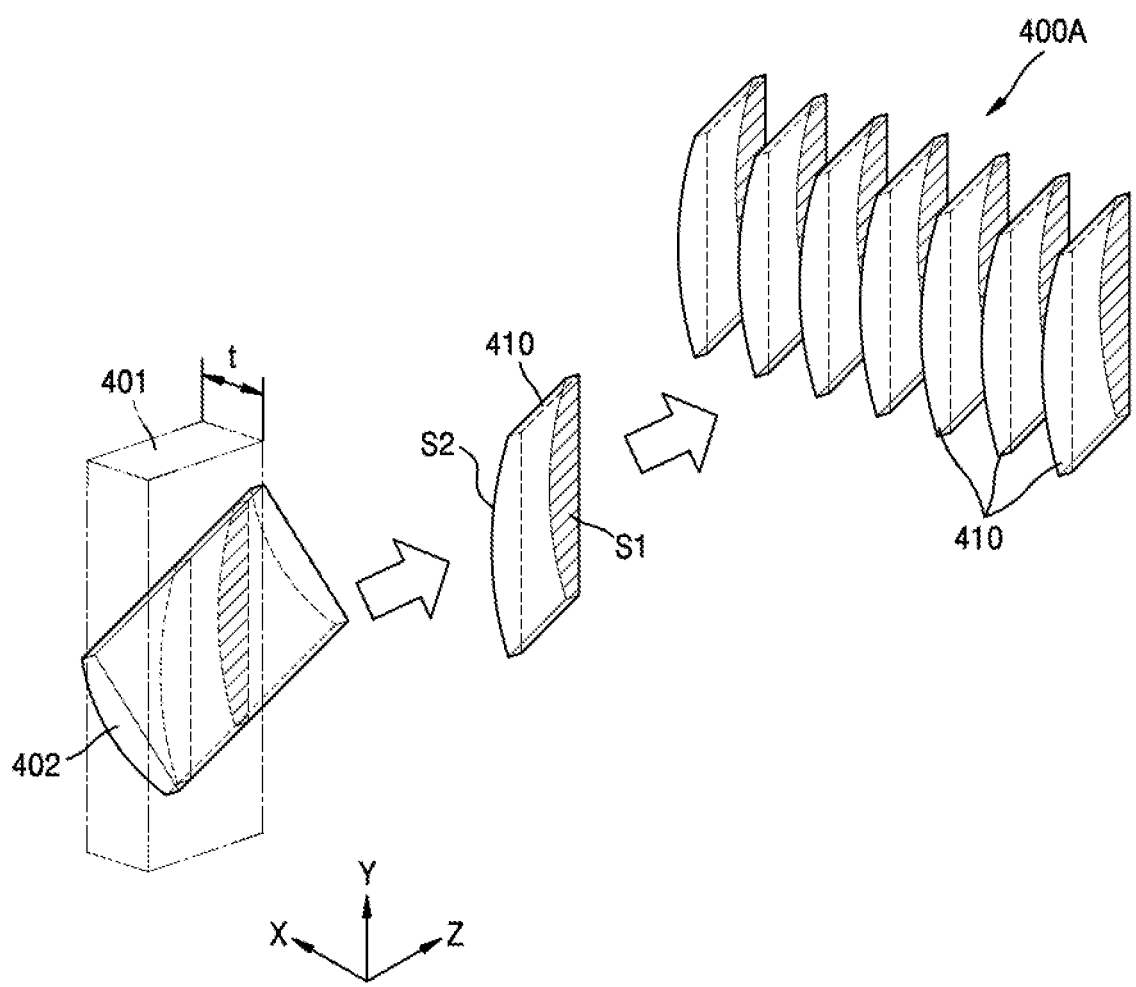
FIG. 5 is a perspective view of an example of a beam-transforming unit of FIG. 1.
Figure 6:
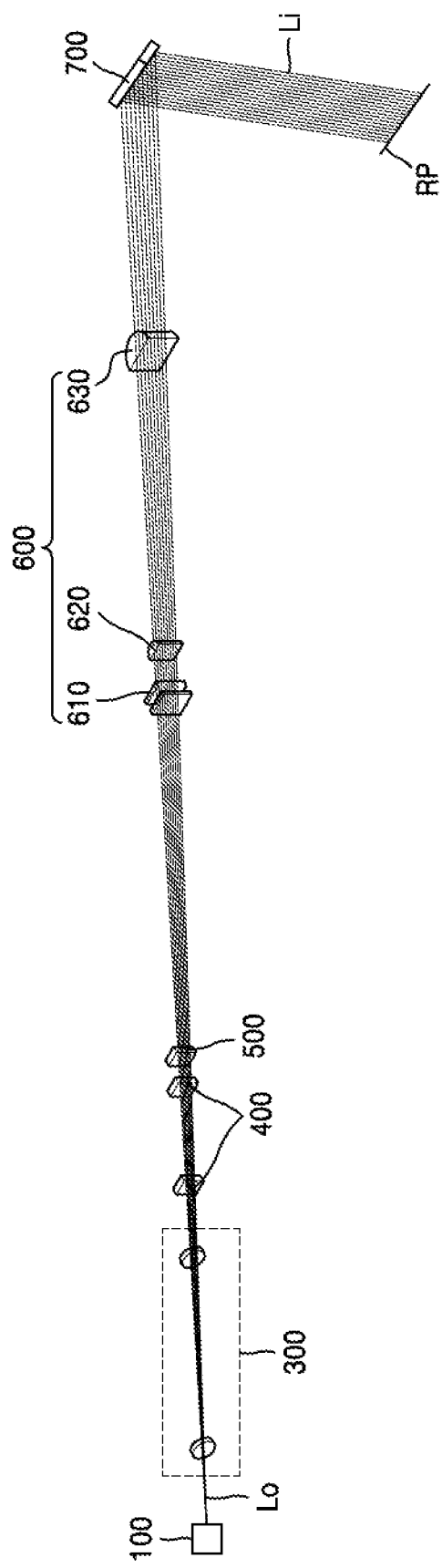
FIG. 6 is a perspective view of the arrangement of elements of the apparatus for forming a line beam of FIG. 1.

FIG. 1 is a block diagram of an apparatus for forming a line beam according to an embodiment, FIG. 2 is a view for explaining a beam-forming principle based on the apparatus for forming a line beam of FIG. 1, FIGS. 3 and 4 are cross-sectional views of an example of a telescope unit of FIG. 1. FIG. 5 is a perspective view of an example of a beam-transforming unit of FIG. 1. FIG. 6 is a perspective view of the arrangement of elements of the apparatus for forming a line beam of FIG. 1.

A line beam formed by the apparatus for forming a line beam according to an embodiment has a long axis and a short axis. In the present specification, a direction in which light progresses is referred to as an optical axis (a Z-axis), a long axis of a line beam perpendicular to the optical axis (the Z-axis) is referred to as an X-axis, and a short axis perpendicular to the optical axis (the Z-axis) and the long axis (the X-axis) and with a line-beam shape is referred to as a Y-axis direction.

Referring to FIGS. 1 to 6, the apparatus for forming a line beam according to an embodiment may include a laser source 100 configured to generate input light Lo, a telescope unit 300, a beam-transforming unit (MTU) 400, a Fourier unit (FO) 500, a long-axis optical unit (LAO) 600, and a short-axis optical unit (SAPO) 700.

Input light Lo generated from the laser source 100 by the apparatus for forming a line beam may be transformed into linear or rectangular output light Li and focused on a reference plane RP.

The laser source 100 may include an Nd-YAG laser or an excimer laser. For another example, the laser source 100 may emit a linearly polarized laser beam. The laser source 100 may include a general laser source and a linear polarizing plate. The laser source 100 may include, for example, an optical fiber laser. The optical fiber laser may be capable of adjusting power over a wide range, have a low maintenance cost, and have high efficiency.

As shown in FIG. 2, the telescope unit 300 may magnify input light Lo in the X-axis direction. For example, the telescope unit 300 may increase a width of a beam formed by the input light Lo in the X-axis direction. In some cases, the telescope unit 300 may also reduce or magnify the input light Lo in the Y-axis direction. The telescope unit 300 may include a cylindrical or spherical lens. For example, the input light Lo may be magnified about 5 times to about 30 times in the X-axis direction by the telescope unit 300 and may vary about 0.2 times to about 1.5 times in the Y-axis direction by the telescope unit 300.

According to one or more embodiments, a laser apparatus may form input light Lo, which may be transformed into a line beam. For example, the input light may be processed by at least one of a telescope unit 300, a beam-transforming unit 400, a fourier unit 500, and a long-axis optical unit 600. Then, the transformed input light may be reflected by a short-axis optical unit 700 to focus the line beam (i.e., reduce the width of the beam in a short-axis direction perpendicular to a long-axis direction, i.e., the line direction of the beam). Both the short-axis direction and the long-axis direction may refer to beam width directions perpendicular to a propagation direction of the beam.

By focusing the line beam using a reflective surface, expansion of the focusing lens due to thermal expansion may be reduced. Therefore, the focused line beam may be more consistent over time, which may reduce defects caused by irradiating a surface (e.g., located at the reference plane RP) with the line beam.

FIGS. 3 and 4 show an example of the telescope unit 300 configured to magnify the distribution of input light Lo in the X-axis direction to produce magnified light. In some cases, the telescope unit 300 also reduces the distribution of the input light Lo in the Y-axis direction. Referring to FIGS. 3 and 4, the telescope unit 300 may include a first lens 310 and a second lens 320 apart from each other on a light path.

As shown in FIGS. 3 and 4, the first lens 310 has an incident surface to which light is incident and an exit surface, the incident surface with a concave shape on an XZ plane, and the exit surface with a convex shape on a YZ plane. As a result, a curvature of the incident surface may be maintained constant in the Y-axis direction, and a curvature of the exit surface may be maintained constant in the X-axis direction. For example, the concave surface of the incident surface and the convex surface of the exit surface may extend to cross each other.

Additionally or alternatively, the second lens 320 has an exit surface of light and an incident surface of light. The exit surface may be a convex shape on the XZ plane. The incident surface may be a convex shape on the YZ plane. As a result, a curvature of the exit surface of the second lens may be maintained constant in the Y-axis direction, and a curvature of the incident surface may be maintained constant in the X-axis direction. For example, the convex surface of the incident surface of the second lens 320 and the convex surface of the exit surface of the second lens 320 may extend to cross each other.

The convex surface of the exit surface of the first lens 310 and the convex surface of the incident surface of the second lens 320 may extend in parallel to each other. The concave surface of the incident surface of the first lens 310 and the convex surface of the exit surface of the second lens 320 may extend in parallel to each other. Therefore, as shown in FIG. 3, since the input light Lo may be incident to the concave incident surface of the first lens 310 and emitted from the convex exit surface of the second lens 320 on the XZ plane, the distribution of light may expand in the X-direction. In contrast, as shown in FIG. 4, since the convex exit surface of the first lens 310 faces the convex incident surface of the second lens 320 on the YZ plane, the distribution of the input light Lo may be reduced in the Y-axis direction.

FIGS. 3 and 4 show an example of the telescope unit 300. The telescope unit 300 may include various configurations, such as various optical parts, lenses, and mirrors.

As shown in FIG. 2, the beam-transforming unit 400 divides light incident from the telescope unit 300 (i.e., the magnified light) to a plurality of sub-columns L arranged in the X-axis direction and rotates each sub-column L by about 90° with respect to the optical axis (the Z-axis). The beam-transforming unit 400 may include a beam splitter and a light rotating unit. In some cases, an intensity of the light within each sub-column L may be greater than an intensity of light between the sub-columns L.

The beam-transforming unit 400 may include two lens arrays 400A with the same lenses. FIG. 5 shows one lens array 400A. The number of lenses 410 included in one lens array 400A may be about 5 to about 20, and each of the plurality of lenses 410 may include a flat first surface S1 and a convex second surface S2. The plurality of lenses 410 may be arranged such that a flat first surface S1 of one of two neighboring lenses 410 contacts a convex second surface S2 of the other lens 410.

The lens 410 of the beam-transforming unit 400 may include surfaces perpendicular to the XZ plane and be formed by an intersection of the planes of a rectangular parallelepiped 401 with a thickness oft in the X-axis direction and a cylinder lens 402 inclined by about 45° with respect to the Y-axis direction around the optical axis (the Z-axis). In an embodiment, the lens 410 may be formed by cutting the cylinder lens 402 in the vertical direction with the cylinder lens 402 inclined by about 45°.

A pitch size of each of the plurality of lenses 410 may be t=2 fm (fm is a focal length of the lens 410). Here, the pitch size may denote the thickness of the lens 410 in the direction in which the lenses 410 are arranged, and a curvature radius of the second surface S2 of the lens 410 may have a value between about 100 nm to about 500 nm.

The plurality of sub-columns L emitted from the beam-transforming unit 400 are incident to the Fourier unit 500. In an embodiment, the Fourier unit 500 may include one cylindrical convex lens. For example, the focal length of the convex lens may be about 3000 nm to about 15000 nm. The light emitted from the beam-transforming unit 400 may show a discontinuity in coordinate space. However, the plurality of sub-columns L emitted from the beam-transforming unit 400 experience one-dimensional Fourier transform through the Fourier unit 500 in angular space.

Accordingly, the plurality of sub-columns L forms one uniform pattern in the coordinate space. For example, the Fourier unit 500 uniformly mixes the plurality of sub-columns L to produce mixed light, and light emitted from the Fourier unit 500 has continuous distribution in the coordinate space. For example, the ight emitted from the Fourier unit 500 may have continuous distribution in the X-axis direction, and differences in the intensity of light between the sub-columns L and the space between sub-columns L may be reduced.

Light passing through the Fourier unit 500 passes through the long-axis optical unit 600 and the short-axis optical unit 700 and may be focused on the reference plane RP in a line shape with a length in the X-axis direction. Light in which the plurality of sub-columns L are mixed by the Fourier unit 500 may be uniformly transformed in a distribution in the X-axis direction by the long-axis optical unit 600. A beam width in the Y-axis direction may be reduced by the short-axis optical unit 700, and the light may be focused on the reference plane RP in a thin linear beam shape.

The long-axis optical unit 600 may include a means configured to uniformly transform the light distribution in the X-axis direction on the XZ plane to produce dispersed light. For example, light which is distributed in multiple sub-columns L arranged in the x-axis direction may be dispersed such that the light is no longer arranged in the subcolumns L. In the example shown in FIG. 6, the long-axis optical unit 600 may include a pair of cylindrical lens arrays 610, a first cylindrical convex lens 620, and a second cylindrical convex lens 630, the pair of cylindrical lens arrays 610 facing each other. The first cylindrical convex lens 620 and the second cylindrical convex lens 630 may be arranged on a light path.

Each of the cylindrical lens arrays 610 may have a shape in which a plurality of cylindrical convex lenses are arranged in a direction perpendicular to the lengthwise direction of the convex lens, and the pair of cylindrical lens arrays 610 may be arranged such that convex surfaces of the convex lenses face each other.

The first cylindrical convex lens 620 may have a shape in which an exit surface thereof is convex. Similar to the first cylindrical convex lens 620, the second cylindrical convex lens 630 may have a shape in which an exit surface thereof is convex.

Light is reflected repeatedly and diffused between the pair of cylindrical lens arrays 610 to have uniform characteristic by the pair of cylindrical lens arrays 610. The light may be uniformly diffused in the X-axis direction while passing through the first cylindrical convex lens 620 and the second cylindrical convex lens 630. Therefore, the long-axis optical unit 600 may make light distribution on the XZ plane more uniform in the X-axis direction. In some examples, the long-axis optical unit 600 makes the light distribution on the XZ plane approximately uniform in the X-axis direction over a width corresponding to a beam width.

The short-axis optical unit 700 does not change the light in the X-axis direction and may reduce a light width in the Y-axis direction. The short-axis optical unit 700 includes a cylindrical concave reflective surface. As a result, a curvature of the reflective surface may be maintained constant in the X-axis direction. For example, light incident to the short-axis optical unit 700 does not pass through the short-axis optical unit 700 and is reflected. Therefore, a width of the light in the Y-axis direction may be reduced finally. Therefore, since a short-axis width of a line beam, which is an emitted light Li focused on the reference plane RP, is reduced and the energy of a laser beam per unit area increases, the efficiency of a laser irradiation process may be increased. Additionally or alternatively, since a focusing lens configured to reduce a short-axis width of a laser beam is not used, a focal length change due to thermal expansion of a focusing lens in the related art may be prevented. An example embodiment is described in more detail with reference to FIGS. 7 and 8.

Figure 7:
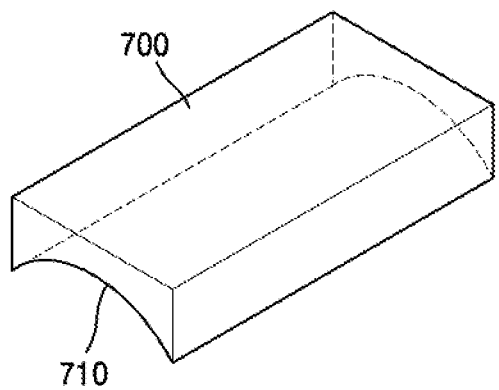
FIG. 7 is a cross-sectional view of an example of a short-axis optical unit of FIG. 1.
Figure 8:
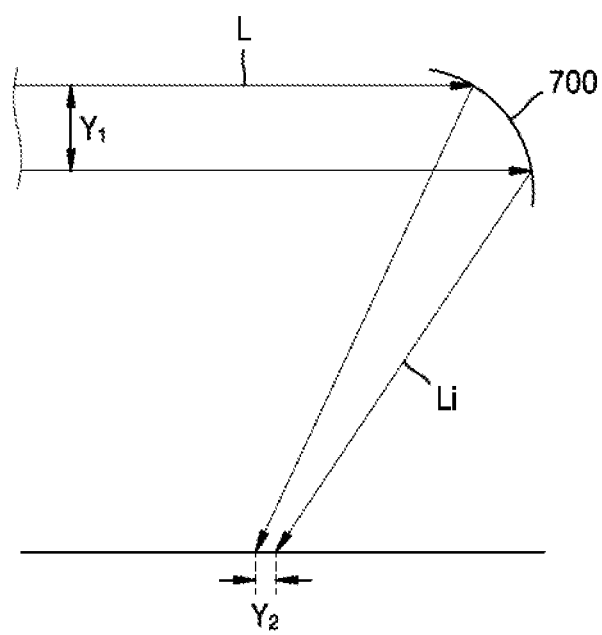
FIG. 8 is a cross-sectional view for explaining a short-axis reduction effect of a line beam due to the short-axis optical unit of FIG. 7.

FIG. 7 is a cross-sectional view of an example of the short-axis optical unit 700 of FIG. 1, and FIG. 8 is a cross-sectional view for explaining a short-axis reduction effect of a line beam by the short-axis optical unit 700 of FIG. 7.

Referring to FIGS. 7 and 8, the short-axis optical unit 700 includes a cylindrical concave reflective surface 710. As a result, a curvature of the reflective surface 710 may be maintained constant in a long-axis direction of a line beam. Therefore, when a laser is reflected by the reflective surface 710 of the short-axis optical unit 700, there is no change in a long axis between incident laser L and emitted light Li reflected. Additionally or alternatively, a short-axis width Y2 of the emitted light Li reflected may be reduced compared to a short-axis width Y1 of the incident laser L. Therefore, the emitted light Li may have increased power of the laser beam per unit area compared to the incident laser L.

The short-axis optical unit 700 may include a material with high thermal stability, for example, fused silica or glass-ceramic. Therefore, since the shape of the short-axis optical unit 700, i.e., the shape of the reflective surface 710 of the short-axis optical unit 700, is not changed by the reflection of the laser L, a change in the focal length of the short-axis optical unit 700 may be prevented.

Since the short-axis optical unit 700 may rotate with respect to an axis parallel to a long axis (the X-axis) of a line beam, the focal length and the position of emitted light may be adjusted. Additionally or alternatively, a cross-section of the reflective surface 710 perpendicular to the X-axis direction may include at least one shape among a cylindrical surface, an aspherical surface, an elliptical surface, and a parabolic surface. For example, one portion of a cross-section of the reflective surface 710 perpendicular to the X-axis direction may have a first curvature, and another portion of the cross-section may have a second curvature different from the first curvature. As a result, the first curvature and the second curvature may be maintained constant in the X-axis direction. Therefore, the width of the short axis (the Y-axis) of the laser beam and the focal length may be adjusted by the short-axis optical unit 700, but the width of the long axis (the X-axis) of the laser beam may not change.

Figure 9:
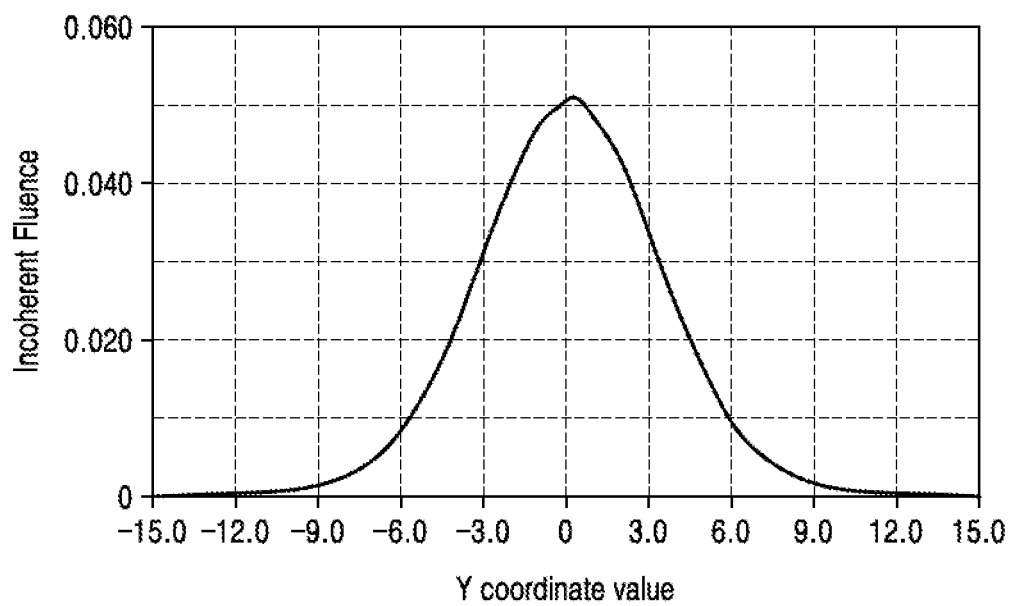
FIG. 9 is a graph showing energy distribution of input light of FIG. 1.
Figure 10:
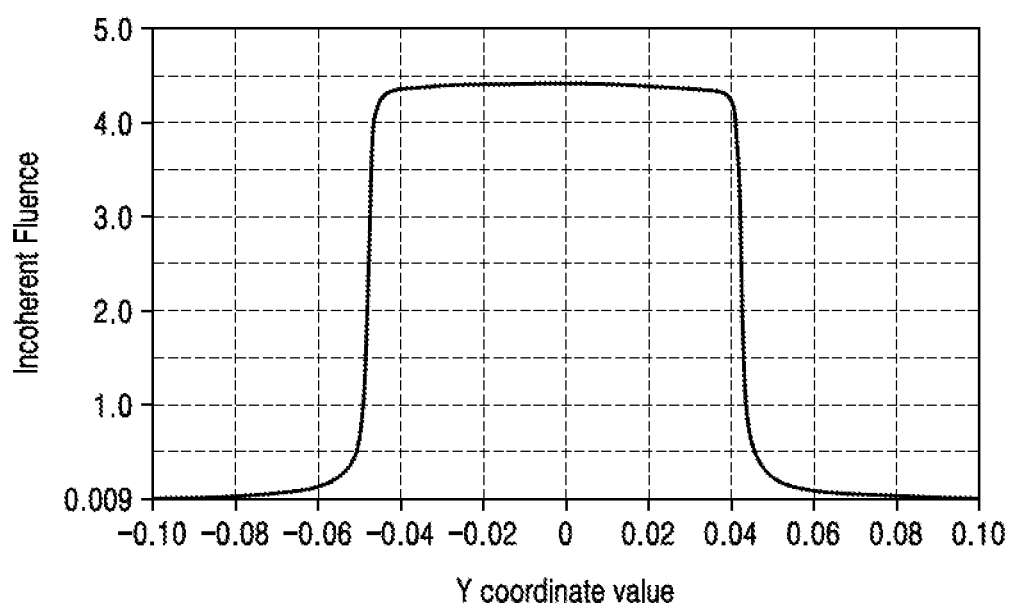
FIG. 10 is a graph showing energy distribution of output light of FIG. 1.
Figure 11:
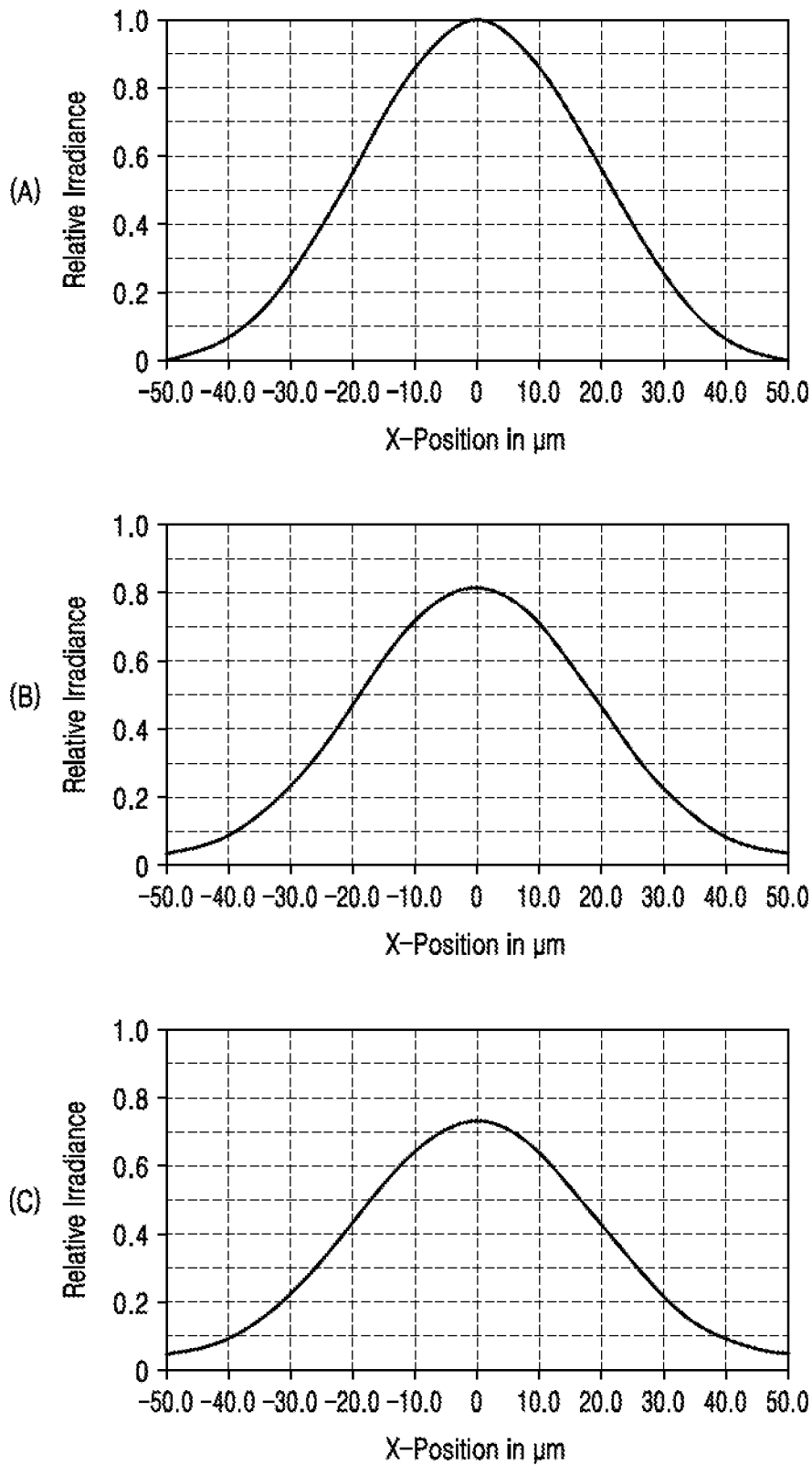
FIG. 11 is a graph showing changes of a focal length of output light according to the related art.
Figure 12:
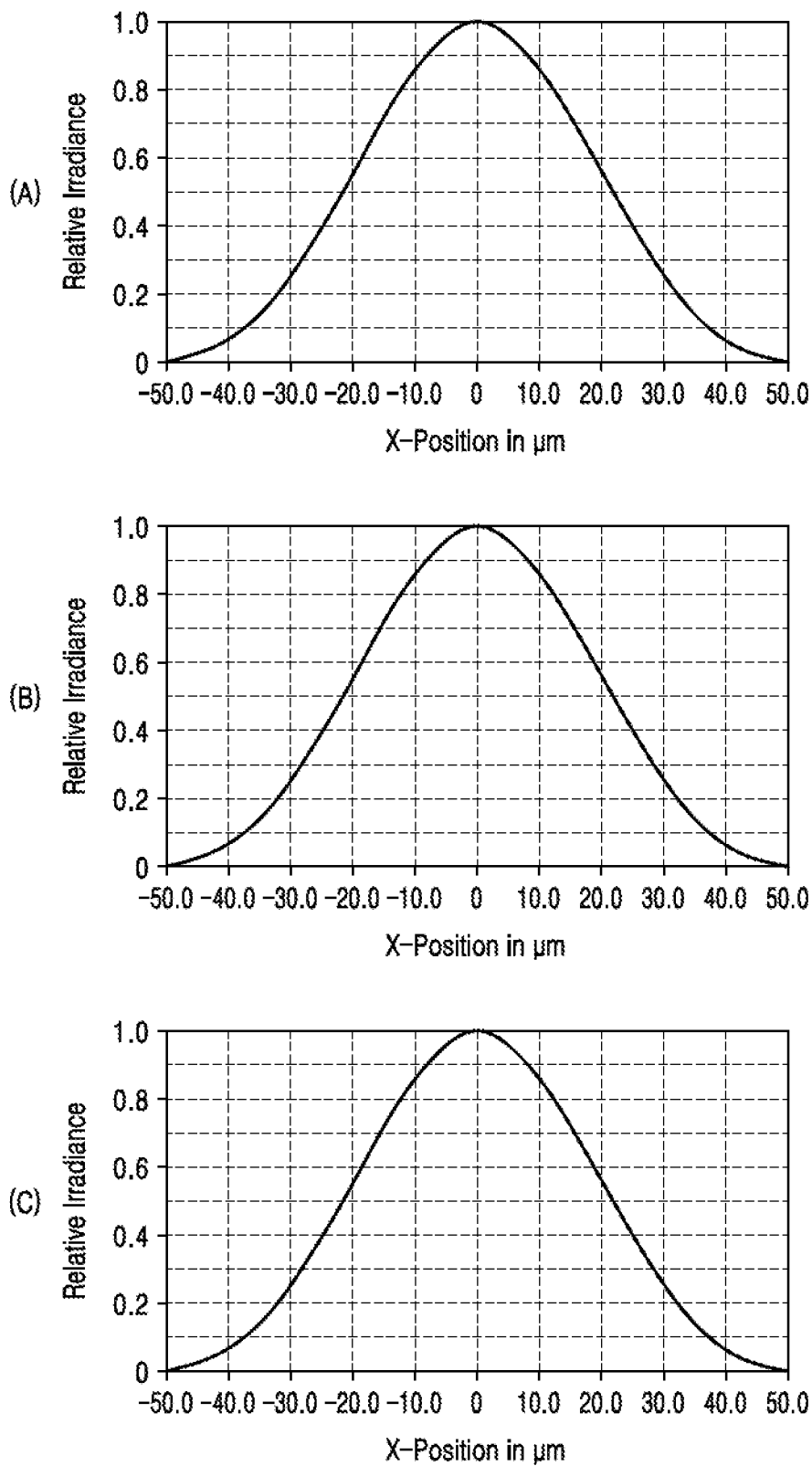
FIG. 12 is a graph showing changes of a focal length of output light of FIG. 1.

FIG. 9 is a graph showing the energy distribution of input light of FIG. 1, FIG. 10 is a graph showing the energy distribution of output light of FIG. 1. FIG. 11 is a graph showing changes in a focal length of output light according to the related art. FIG. 12 is a graph showing changes in a focal length of output light of FIG. 1.

FIG. 9 shows a beam profile of input light Lo (see FIG. 1) in the Y-axis direction, and FIG. 10 shows a beam profile of output light Li (see FIG. 1) in the Y-axis direction. As shown in FIG. 9, the input light Lo (see FIG. 1) has a Gaussian-shaped energy distribution. In contrast, as shown in FIG. 10, a beam profile of output light Li (see FIG. 1) is concentrated on a predetermined value in the Y-axis direction. For example, a line beam formed by the apparatus for forming a line beam, according to the present embodiment, may provide a flat-top laser beam with uniform spatial distribution in the Y-axis direction as well as the X-axis direction.

FIG. 11 shows a change in an energy profile measured on the reference plane RP (see FIG. 1) when the input light Lo (see FIG. 1) passes through a focusing lens according to the related art and is irradiated to the reference plane RP (see FIG. 1), and FIG. 12 shows a change in an energy profile measured on the reference plane RP (see FIG. 1) when the input light Lo (see FIG. 1) is reflected by a reflective surface of the short-axis optical unit 700 (FIG. 1) and is irradiated to the reference plane RP (see FIG. 1).

FIGS. 11A and 12A show the case when a laser is irradiated to the reference plane RP (see FIG. 1), FIGS. 11B and 12B show the case when a laser is irradiated to the reference plane RP (see FIG. 1) for five seconds (t=5 sec), and FIGS. 11C and 12C show the case when a laser is irradiated to the reference plane RP (see FIG. 1) for ten seconds (t=10 sec).

As shown in FIG. 11, in the case where input light Lo (see FIG. 1) is irradiated to the reference plane RP (see FIG. 1) by using a focusing lens according to the related art, the energy distribution of the laser, measured on the reference plane RP (see FIG. 1), changes when an irradiation time of the laser increases. The focusing lens thermally expands by absorbing the heat of the laser as time elapses. Therefore, the focal length of the focusing lens changes.

FIG. 12 shows an exemplary embodiment of no change in the energy distribution of the laser when an irradiation time of the laser elapses, measured on the reference plane RP (see FIG. 1). Since the short-axis optical unit 700 (see FIG. 1) includes the reflective surface, a change may not be generated to the shape of the short-axis optical unit 700 (see FIG. 1).

For example, according to an embodiment, the focal length associated with the laser beam may be prevented from changing during a laser irradiation process since the apparatus for forming a line beam includes a short-axis optical unit with a reflective surface that may reduce a short-axis width of the line beam, even when the power of a laser beam per unit area is increased. Therefore, the reliability of the laser beam irradiation process may be increased.

According to embodiments, since the apparatus for forming a line beam includes a short-axis optical unit with a reflective surface that may reduce a short-axis width of the line beam, the focal length associated with a laser beam change during a laser irradiation process may be prevented.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An apparatus for forming a line beam, the apparatus comprising:
   a laser source configured to generate input light;
   a telescope unit configured to magnify the input light in an X-axis direction perpendicular to an optical axis to produce magnified light, wherein the optical axis comprises a progression direction of the input light;
   a beam-transforming unit configured to divide the magnified light from the telescope unit into a plurality of sub-columns;
   a Fourier unit configured to uniformly mix the plurality of sub-columns to produce mixed light;
   a long-axis optical unit configured to uniformly disperse the mixed light from the Fourier unit in the X-axis direction to produce dispersed light; and
   a short-axis optical unit configured to focus the dispersed light from the long-axis optical unit onto a reference plane, wherein the long-axis optical unit includes a pair of cylindrical lens arrays, a first cylindrical convex lens, and a second cylindrical convex lens in a linear arrangement with a same optical axis, wherein the pair of cylindrical lens arrays, the first cylindrical convex lens, and the second cylindrical convex lens are located before the short-axis optical unit in a travelling direction of the dispersed light, wherein the short-axis optical unit includes a concave reflective surface, and wherein a curvature of the reflective surface is constant in the X-axis direction, and wherein the short-axis optical unit is rotatable with respect to an axis parallel to the X-axis direction.

2. An apparatus for forming a line beam, the apparatus comprising:
 a laser source configured to generate input light with a Gaussian profile;
 a telescope unit configured to magnify the input light in an X-axis direction perpendicular to an optical axis to produce magnified light, wherein the optical axis is a progression direction of the input light, and to reduce a width of the input light in a Y-axis direction perpendicular to the optical axis and the X-axis direction;
 a beam-transforming unit configured to divide the magnified light from the telescope unit into a plurality of sub-columns;
 a Fourier unit configured to uniformly mix the plurality of sub-columns to produce mixed light;
 a long-axis optical unit configured to uniformly disperse the mixed light from the Fourier unit in the X-axis direction; and
 a short-axis optical unit configured to reflect the mixed light from the long-axis optical unit and focus a flat-top line beam onto a reference plane, the flat-top line beam including a long axis in an X-axis direction and a short axis in a Y-axis direction perpendicular to the X-axis direction,
 wherein the short-axis optical unit includes a reflective surface configured to reflect the mixed light from the long-axis optical unit, a length of a long axis of the mixed light from the long-axis optical unit is equal to a length of a long axis of the flat-top line beam, and a width of a short axis of the mixed light from the long-axis optical unit is greater than a width of a short axis of the flat-top line beam,
 wherein the short-axis optical unit is rotatable with respect to an axis parallel to the X-axis direction.

3. The apparatus of claim 2, wherein a curvature of a cross-section of the reflective surface perpendicular to the X-axis direction is constant in a direction parallel to the X-axis direction.

4. The apparatus of claim 3, wherein the cross-section of the reflective surface includes a shape corresponding to at least one of a cylindrical surface, an aspherical surface, an elliptical surface, and a parabolic surface.

5. The apparatus of claim 3, wherein a first portion of the cross-section of the reflective surface has a first curvature, and a second portion of the cross-section of the reflective surface has a second curvature.

6. The apparatus of claim 2, wherein the reflective surface includes a concave reflective surface with a cylindrical shape.

7. The apparatus of claim 2, wherein the short-axis optical unit includes fused silica or glass ceramic.

8. The apparatus of claim 2, wherein the telescope unit includes a first lens and a second lens spaced apart from each other,
 a concave surface of an incident surface of the first lens extends to cross a convex surface of an exit surface of the first lens, and
 a convex surface of an incident surface of the second lens extends to cross a convex surface of an exit surface of the second lens.

9. The apparatus of claim 8, wherein the convex surface of the exit surface of the first lens extends in parallel to the convex surface of the incident surface of the second lens, and
 the concave surface of the incident surface of the first lens extends in parallel to the convex surface of the exit surface of the second lens.

10. The apparatus of claim 2, wherein the plurality of sub-columns are arranged in the X-axis direction, and
 the beam-transforming unit rotates each of the plurality of sub-columns by about 90° with respect to the optical axis.

11. An apparatus for forming a line beam, the apparatus comprising:
 a laser source configured to generate input light;
 a telescope unit configured to magnify the input light in an X-axis direction perpendicular to an optical axis to produce magnified light, wherein the optical axis comprises a progression direction of the input light;
 a beam-transforming unit configured to divide the magnified light from the telescope unit into a plurality of sub-columns;
 a Fourier unit configured to uniformly mix the plurality of sub-columns to produce mixed light;
 a long-axis optical unit configured to uniformly disperse the mixed light from the Fourier unit in the X-axis direction to produce dispersed light; and
 a short-axis optical unit configured to focus the dispersed light from the long-axis optical unit onto a reference plane,
 wherein the short-axis optical unit includes a concave reflective surface, wherein a curvature of the reflective surface is constant in the X-axis direction, and wherein the short-axis optical unit is rotatable with respect to an axis parallel to the X-axis direction.

12. The apparatus of claim 11, wherein the line beam includes a long axis in the X-axis direction and a short axis in a Y-axis direction perpendicular to the X-axis direction, and
 the short-axis optical unit is configured to reduce a short-axis width of the dispersed light from the long-axis optical unit.

13. The apparatus of claim 11, wherein the short-axis optical unit includes fused silica or glass ceramic.

14. The apparatus of claim 11, wherein a cross-section of a concave reflective surface perpendicular to the X-axis direction comprises a cross-section of at least one of a cylindrical surface, an aspherical surface, an elliptical surface, and a parabolic surface.

15. The apparatus of claim 14, wherein a first portion of the cross-section of the reflective surface has a first curvature, and a second portion of the cross-section of the reflective surface has a second curvature.

16. The apparatus of claim 11, wherein the plurality of sub-columns are arranged in the X-axis direction, and
 the beam-transforming unit rotates each of the plurality of sub-columns by about 90° with respect to the optical axis.

17. The apparatus of claim 11, wherein the Fourier unit includes one cylindrical convex lens with a focal length of about 3000 mm to about 15000 mm.

18. The apparatus of claim 11, wherein the telescope unit includes a first lens and a second lens spaced apart from each other,
- a concave surface of an incident surface of the first lens extends to cross a convex surface of an exit surface of the first lens, and
- a convex surface of an incident surface of the second lens extends to cross a convex surface of an exit surface of the second lens.

19. The apparatus of claim 18, wherein the convex surface of the exit surface of the first lens extends in parallel to the convex surface of the incident surface of the second lens, and
- the concave surface of the incident surface of the first lens extends in parallel to the convex surface of the exit surface of the second lens.

* * * * *